(12) United States Patent
Suzuki (10) Patent No.: US 7,392,402 B2
(45) Date of Patent: Jun. 24, 2008

(54) METHOD AND APPARATUS FOR DATA INTEGRATION SECURITY

(75) Inventor: Motoyuki Suzuki, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 757 days.

(21) Appl. No.: 10/613,357

(22) Filed: Jul. 2, 2003

(65) Prior Publication Data

US 2005/0005091 A1  Jan. 6, 2005

(51) Int. Cl.
*G06F 21/00* (2006.01)
(52) U.S. Cl. ....................................... 713/193
(58) Field of Classification Search ................. 713/193
See application file for complete search history.

(56) References Cited

U.S. PATENT DOCUMENTS

| | | | | |
|---|---|---|---|---|
| 5,794,234 | A * | 8/1998 | Church et al. | 707/4 |
| 5,845,283 | A * | 12/1998 | Williams et al. | 707/101 |
| 6,735,765 | B1 | 5/2004 | Schumacher | |
| 6,754,679 | B2 | 6/2004 | Oheda | |
| 2001/0029502 | A1 * | 10/2001 | Oeda | 707/10 |
| 2002/0059263 | A1 | 5/2002 | Shima et al. | |
| 2002/0059427 | A1 * | 5/2002 | Tamaki et al. | 709/226 |
| 2003/0084108 | A1 * | 5/2003 | Syed | 709/206 |
| 2003/0142847 | A1 * | 7/2003 | Rhoads | 382/100 |
| 2004/0044803 | A1 | 3/2004 | Mashima | |
| 2005/0021969 | A1 * | 1/2005 | Williams et al. | 713/176 |

OTHER PUBLICATIONS

Bruce Schneier, Applied Cryptography 2nd Edition.*
"Ascential Enterprises Integration Suite," product datasheet, Ascential Software Westboro, MA (2002).
"Hitachi Storage Solution Suite with Oracle," product information, Hitachi, Ltd., Oracle Corp. (2002).
"ISAM," definition of term from search390.techtarget.com, TechTarget Corporation Needham, MA (2001).
BOHL *Introduction to IBM direct access storage devices* Science Research Associates, Inc. pp. 72-75 (1981).

(Continued)

*Primary Examiner*—Kambiz Zand
*Assistant Examiner*—Andrew L Nalven
(74) *Attorney, Agent, or Firm*—Townsend and Townsend and Crew LLP (57) ABSTRACT

A method for performing data integration between two or more computer systems provided over a network includes extracting data from a first database associated with a first computer system of first type, the extracted data having a first file format and a first character-set format. The data are encrypted using a first security key. The encrypted data are stored in a shared volume provided in a storage system, the storage system being coupled to a plurality of computer systems. The encrypted data are received from the shared volume of the storage system at a second computer system of second type, the first and second computer system being of different computer systems. The received data are converted from the first file format to a second file format, the first file format being suitable for the first computer system and the second file format being suitable for the second computer system. The received data are decrypted using a second security key that is associated with the first security key. The received data are converted from the first character-set format to a second character-set format, the first character-set format being suitable for the first computer system, the second character-set format being suitable for the second computer system.

21 Claims, 8 Drawing Sheets

OTHER PUBLICATIONS

Diffie et al. "Privacy and Authentication: An introduction to Cryptography," Proc. IEEE 67:397-427 (1979).

*Hitachi Freedom Storage™ Software Solution Guide* p. 50, figure 22, Hitachi Data Systems Corporation Santa Clara, CA (2003).

* cited by examiner

METHOD AND APPARATUS FOR DATA INTEGRATION SECURITY

BACKGROUND OF THE INVENTION

The present application relates to data processing, in particular to data integration between at least two different computer systems.

As the demand for data volumes continue to grow and pace of business becomes faster and more competitive, effective management of storage systems is becoming more and more important for enterprises. Many enterprises use two or more different computer systems, e.g., an open system and a mainframe system, for storing their data.

The term "open system" refers to a computer system that provides interoperability with systems that are manufactured by a plurality of vendors and are not restricted by proprietary standards. Generally, the term "open system" commonly refers to Unix-based systems. Since the emergence of The Open Group's Single Unix Specification, any operating system that supports the Unix APIs is considered to be an open system. Another example of the open system is a system that runs Window NT™ of Microsoft. The open system is commonly used in applications that require versatilities, e.g., customer relation management applications, due to its interoperability.

The term "mainframe" refers to large, powerful, and expensive computer used by enterprises for bulk data processing. Many of the mainframes currently being used by enterprises are those manufactured by IBM. Many of these, particularly older versions, are incompatible with the other systems, e.g., an open system. Generally, the mainframes are more robust than the open system so the former is used for more often in applications where robustness is of the primary importance, e.g., accounting applications.

Enterprises generally have one or more mainframe systems and one or more open systems. Accordingly, one of data management issues faced by the enterprises is data integration between the open system and mainframe system. The data integration may be done over a local area network (LAN) or storage area network (SAN). The LAN refers to a computer network covering a local area, such as an office or a building. The SAN refers to a network whose primary purpose is the transfer of data between computer system and storage elements and among storage elements. A SAN generally includes a communication infrastructure for providing physical connections and a management layer for organizing the connections, storage elements, and computer systems so that the data transfer is secure and robust. Alternatively, the SAN may also refer to a storage system including storage elements, storage devices, and computerr systems.

BRIEF SUMMARY OF THE INVENTION

In one embodiment, a method for performing data integration between two or more computer systems provided over a network includes extracting data from a first database associated with a first computer system of first type, the extracted data having a first file format and a first character-set format. The data are encrypted using a first security key. The encrypted data are stored in a shared volume provided in a storage system, the storage system being coupled to a plurality of computer systems. The encrypted data are received from the shared volume of the storage system at a second computer system of second type, the first and second computer system being of different computer systems. The received data are converted from the first file format to a second file format, the first file format being suitable for the first computer system and the second file format being suitable for the second computer system. The received data are decrypted using a second security key that is associated with the first security key. The received data are converted from the first character-set format to a second character-set format, the first character-set format being suitable for the first computer system, the second character-set format being suitable for the second computer system.

The first computer system is a mainframe system, and the second computer system is an open system, and the plurality of computer systems being associated with a plurality of different companies. The first file format is a counter key data format. The second file format is a fixed block architecture format. The first character-set format is an Extended Binary Coded Decimal Interchange Code (EBCDIC) format. The second character-set format is an American Standard Code for Information Interchange(ASCII) format. The first security key is a public key associated with the second computer system, and the second security key is a private key associated with the second computer system. The first security key is a private key associated with the first computer system, and the second security key is a public key associated with the first computer system.

The method also includes storing the encrypted data in a first volume of the storage system, the first volume being associated with the first computer system. The plurality of computer systems are associated with a plurality of different companies. The shared volume is configured to be accessed only by computer systems of a given company, the first and second computer systems being associated with the given company. The step of decrypting the received data using a second security key is performed after the step of converting the received data from the first file format to a second file format, and the step of converting the received data from the first character-set format to a second character-set format is performed after the step of decrypting the received data using a second security key.

The method also includes generating a digital signature of the first computer system using the extracted data; transmitting the digital signature from the first computer system to the second computer system; receiving the digital signature at the second computer system; and validating the received digital signature at the second computer system. The digital signature is transmitted from the first computer system to the second computer system via a first communication link that is different from a second communication link that is used to transfer the data from the first computer system to the second computer system.

In another embodiment, a method for performing data integration between two or more computer systems provided over a network includes extracting data from a first database associated with a first computer system of first type, the extracted data having a first format that is suitable for the first computer system; encrypting the data using a first security key; and storing the encrypted data in a shared volume provided in a storage system, the storage system being coupled to a plurality of computer systems associated with a plurality of companies, wherein the first security key is a public key of a second computer system, the second computer system configured to handle data having a second format, wherein the first format and the second format are different.

In yet another embodiment, a method for sharing data between a plurality of computer systems sharing a storage system includes receiving an encrypted data from a shared volume of the storage system at a second computer system of second type, the encrypted data being data that has been extracted from a first volume of the storage system that is associated with a first computer system of first type; converting the received data from a first format to a second format, the first format being suitable for the first computer system and the second format being suitable for the second computer system; decrypting the received data using a second security key that is associated with a first security key that has been used to encrypt the extracted data at the first computer system; and thereafter, loading the data to a second volume of the storage system, the second volume being associated with the second computer system.

The method also includes converting the received data from a third format to a fourth format, the third format being suitable for the first computer system, the fourth format being suitable for the second computer system. The first format is a file format of first type, and the second format is a file format of second type. The third format is a character-set of first type, and the fourth format is a character-set of second type. The step of converting the received data from a third format to a fourth format is performed after the step of decrypting the received data using a second security key, and the step of decrypting the received data using a second security key is performed after the step of converting the received data from a first format to a second format.

The method also includes receiving a digital signature of the first computer, the digital signature being associated with the received data; and authenticating the digital signature of the first computer system. The digital signature is received via a local area network and the data is received via a storage area network.

In yet another embodiment, a computer system includes an interface for coupling with a storage system; and a computer storage medium. The computer medium includes code for receiving an encrypted data from a shared volume of the storage system, the encrypted data being data extracted from a first volume of the storage system that is associated with another computer system that is different than the computer system; code for converting the received data from a first format to a second format, the first format being suitable for the another computer system and the second format being suitable for the computer system; code for decrypting the received data using a second security key that is associated with a first security key that has been used to encrypt the extracted data at the another computer system; and code for loading the data to a second volume of the storage system, the second volume being associated with the computer system. The interface includes a SCSI interface, Fibre Channel interface, an ESCON interface.

In yet another embodiment, a computer readable medium includes code for receiving an encrypted data from a shared volume of the storage system at a second computer system of second type, the encrypted data being data extracted from a first volume of the storage system that is associated with a first computer system of first type; code for converting the received data from a first format to a second format, the first format being suitable for the first computer system and the second format being suitable for the second computer system; code for decrypting the received data using a second security key that is associated with a first security key that has been used to encrypt the data at the first computer system; and code for loading the data to a second volume of the storage system, the second volume being associated with the second computer system. The first and second security keys are associated with a Public Key Cryptography standard As used herein, the term "storage system" refers to a computer system having a storage area. The storage system includes a computer, a single storage subsystem, or a plurality of storage subsystems coupled to each other via a network, or a data center including a host and a storage subsystem, or a plurality of data centers.

As used herein, the term "storage subsystem" refers to a storage device having a storage area and a processor to process input and output requests to the storage area. The storage subsystem includes a disk array unit, a computer, and magnetic-tape storage unit.

DETAILED DESCRIPTION OF THE INVENTION

Figure 1:
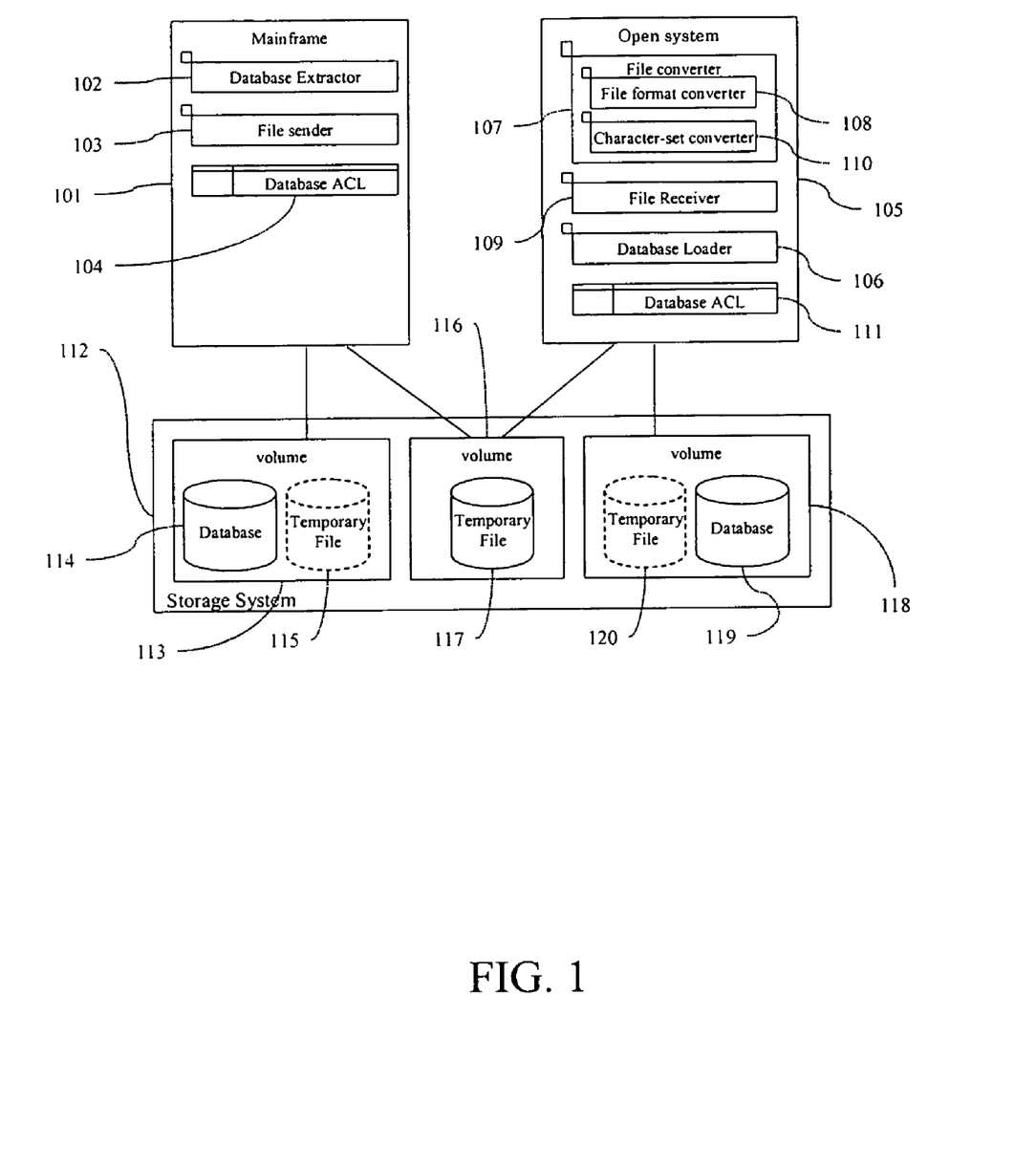
FIG. 1 illustrates a data integration process performed in a conventional SAN.

FIG. 1 illustrates a data integration process performed in a conventional SAN. A mainframe 101 is associated with a first volume 113. The first volume includes a database 114. The database 114 is configured to be accessible by the mainframe, but not by the open system. A database ACL 104 includes an access control list and is provided in the mainframe to enable the mainframe to access the database 114. The database ACL is used to define access to the database tables and columns by certain users.

An open system 105 is associated with a second volume 118. The second volume includes a database 119 and is configured to be accessible by the open system, but not the mainframe. A database ACL 111 includes an access control list and is provided in the open system to enable the open system to access the database 119.

These two volumes are provided in a storage system 112 that is coupled to the open system and mainframe via a SAN (not shown). The storage system also includes a shared volume 117 that can be accessed by both the mainframe and the open system.

The storage system may be a single storage subsystem, e.g., disk array unit, or a plurality of storage subsystems coupled to each other via the SAN and distributed over multiple sites. A disk array unit includes a plurality of disk drives and a controller to manage input and output requests to the disk drives, as explained in U.S. patent application Ser. No. 09/561,404, filed on Apr. 27, 2000 and U.S. Ser. No. 10/355, 695, filed on Jan. 10, 2003, both of which are assigned to the assignee of the present application and are incorporated by reference.

Data integration involves enabling two different systems, e.g., the open system and the mainframe, to share data provided in the respective volumes. For data integration, the mainframe 102 includes a database extractor 102 and a file sender 103. The database extractor is a module that extracts data from the database 114. The file sender 103 is a module that sends r a temporarily file 115 from the volume 113 to the open system via the shared volume 116. The temporary file 115 corresponds to the extracted data. Temporary files 117 and 120 are formed on the shared volume and the database 118, respectively, during the data integration process.

The open system 105 includes a file receiver 109, a file converter 107, a data loader 106, and a file format converter 108. The file receiver is a module that receives the temporary file 115 from the mainframe system 101. A database loader 106 is a module that loads the data to the database 119. The file converter 107 is a module that enables the open system to access the temporary file. The file converter 107 in turn has a file format converter 108 and a character-set converter 110. The file format converter 108 is a sub-module that converts the file format, e.g., from the count key data (CKD) or file format to the text format. The character-set converter 110 is a sub-module that converts the character-set, e.g., from EBCDIC character-set to ASCII character-set.

Generally, data integration is performed by transferring data rather than a file from one database (e.g., the database 114) to another database (e.g., the database 119). A data integration process includes extracting data from the database 114 using the database extractor 102 at the mainframe. The extracted data are stored in the temporary file. The temporary file 115 is send to the shared volume 116, as indicated by the temporary file 117. The temporary file 115 is then send to the volume 118 of the open system. The file sender 103 initiates the sending of the temporarily file 115.

The open system 105 receives the temporary file 117 using the file receiver 109. The temporary file is converted to a format that is compatible with the open system using the file converter. The converted data is stored in the temporary file 120 and then loaded into the database 119 using the database loader 106.

The shared volume 116 is accessible by the mainframe system and open system. In certain instances, a third party may also gain access to the shared volume. The file format of the temporary file 117 is usually "human-visible" file. Therefore, storing the temporary file in the shared volume raises a security concern since a third party can monitor and improperly access or rewrite the temporarily file 117.

One solution to the above security issue is the use of a LAN rather than a SAN. However, LAN provides a slower data integration than SAN. Another solution is to use a dedicated storage subsystem as a shared volume. However, it would significantly increase the cost of ownership.

Figure 2:
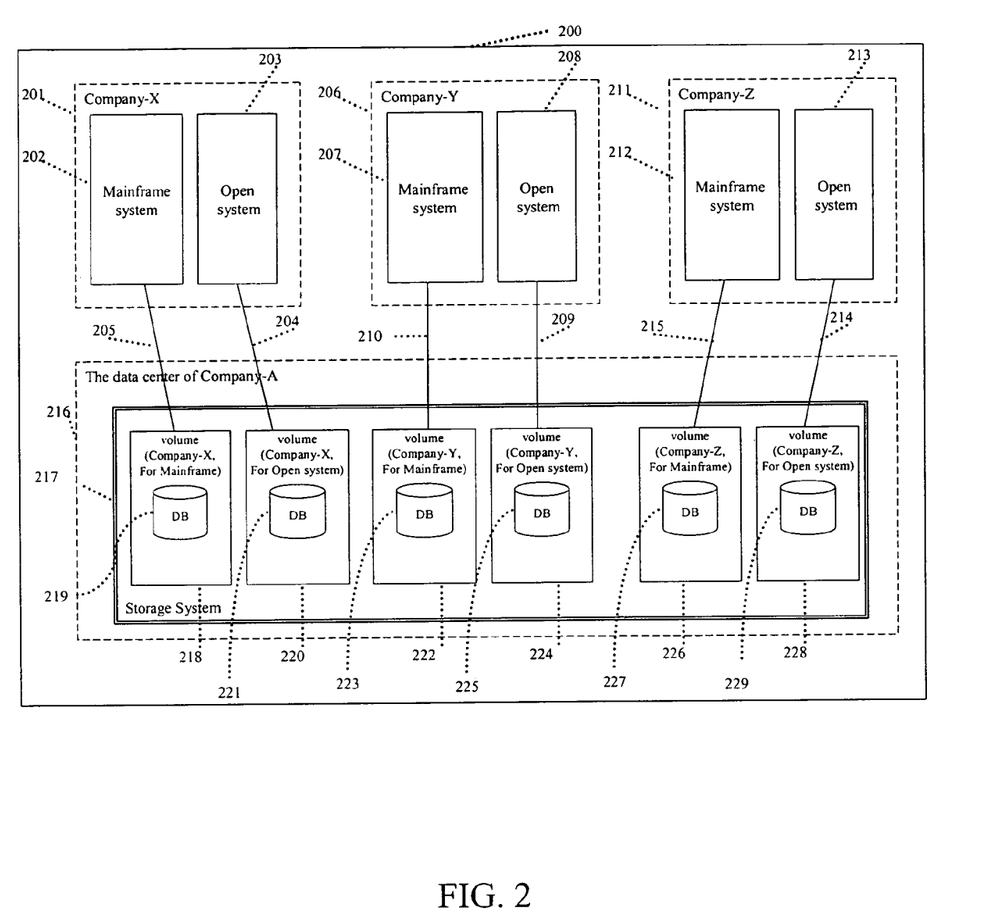
FIG. 2 illustrates a conventional information processing system including a storage system and a plurality of computer systems that are associated with Companies X, Y and Z, respectively.

FIG. 2 illustrates a conventional information processing system 200 including a storage system 217 and a plurality of computer systems 201, 206, and 211 that are associated with Companies X, Y and Z, respectively. The computer system 201 of Company X includes a mainframe system 202 and an open system 203. The computer system 206 of Company Y includes a mainframe system 207 and an open system 208. The computer system 213 of Company Z includes a mainframe system 212 and an open system 213. A plurality of communication links 204, 205, 209, 210, 214, and 215 coupled the plurality of computer systems. The communications links may be Enterprise Systems Connection (ESCON), Fibre Channel, and Small Computer System Interface (SCSI). Generally the communication links coupling the mainframes and the storage system are ESCON, and the communication links coupling the open systems and the storage systems are Fibre Channel or SCSI.

The storage system 217 is operated by a data center company 216. The storage system includes one or more storage subsystems. The storage system 217 includes a plurality of volumes 218, 220, 222, 224, 226, and 228. Each of the volumes are associated with one of the computer system. For example, the volume 218 is associated with the mainframe 202 of Company X; the volume 220 is associated with the open system 203 of Company X; the volume 222 is associated with the mainframe 207 of Company Y; the volume 224 is associated with the open system 208 of Company Y; the volume 226 is associated with the mainframe 212 of Company Z; the volume 228 is associated with the open system 213 of Company Z. The storage system 217 is coupled to the computer systems 201, 206, and 211 via a SAN (not shown).

In the system 200 above, the Company X may be wish to perform data integration between the mainframe and the open system. However, they may be wary of the security risk involved with this process since it would involve storing a temporarily file in a shared volume that other companies may be able to access, particularly if an administrator makes a configuration error. Therefore, it would be desirable to provide a data integration method with enhanced security.

Figure 3:
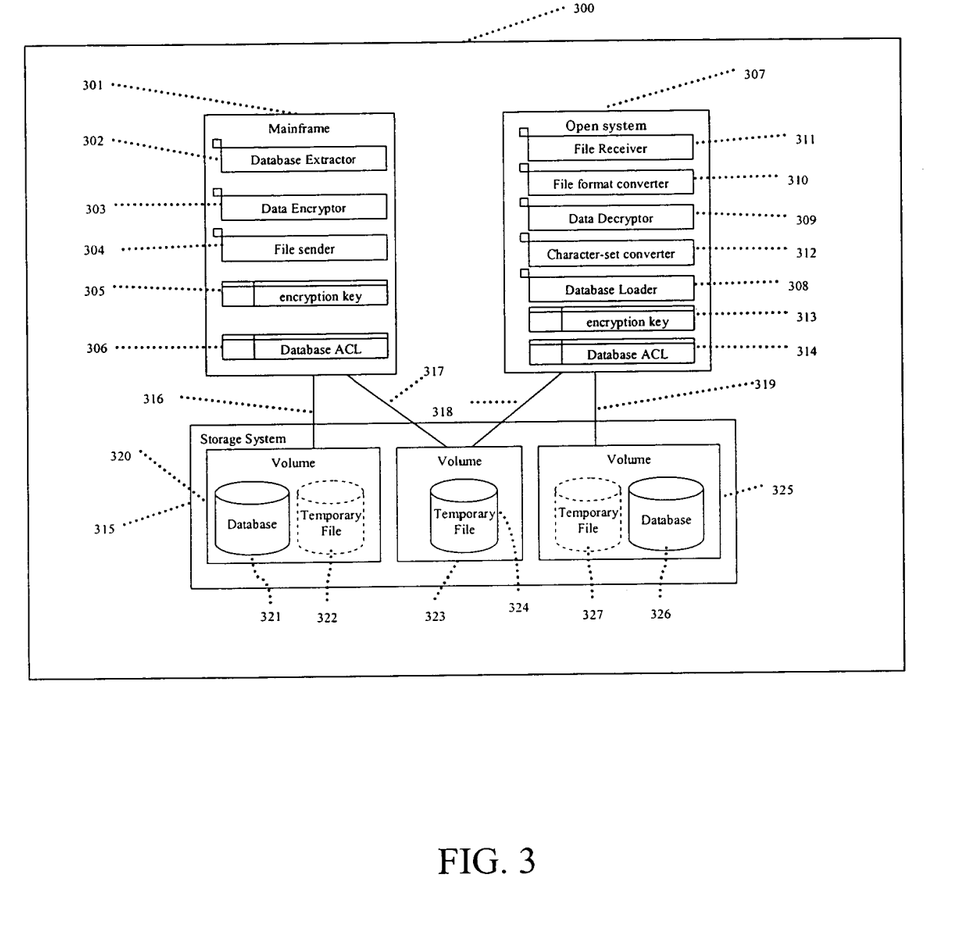
FIG. 3 illustrates an information processing system that provides data integration with enhanced security features according to one embodiment of the present invention.

FIG. 3 illustrates an information processing system 300 that provides data integration with enhanced security features according to one embodiment of the present invention. The system 300 includes a mainframe system 301, an open system 307, and a storage system 315. The mainframe is coupled to the storage system via communication links 316 and 317. The open system is coupled to the storage system via communication links 318 and 319.

The mainframe 301 includes a database extractor 302, a data encryptor 303, a file sender 304, an encryption key 305, and a database ACL 306. The encryptor 303 is a module that encrypts the data with the encryption key 305. In one implementation, the Public Key Cryptography standard is used. The key 305 is a public key of the open system 307 according to this implementation.

The open system 307 includes a file receiver 311, a file format converter 310, a data decryptor 309, a character-set converter 312, a data loader 308, an encryption/decryption key 313, and a database ACL 314. The file format converter 310 is a module for converting the format of a temporary file received from the mainframe. The character-set converter 312 is a module that converts the character set from a first character set that is suitable for the mainframe, e.g., CKD, to a second character set that is suitable for the open system, e.g., FBA. The data decryptor 309 is a module that decrypts or decodes the data with the key 313. The key 313 is a private key corresponding to the public key provided in the mainframe according to one implementation, which uses the Public Key Cryptography standard. Other methods of encryption/decryption or encoding/decoding may be used.

The storage system 315 includes a volume 320 associated with the mainframe 301 and a volume 325 associated with the open system 307, and a shared volume 323 that may be accessed by both the mainframe and the open system.

In one embodiment, the data integration is performed by storing the extracted data in a temporary file 322 at the volume 320 and sending the temporarily file to the shared volume to be saved as the temporary file 324. The temporarily file 324 is retrieved or transmitted to the open system and stored as the temporary file 327 in the volume 325 of the open system. The temporary file is then processed at the open system. The processed data is then loaded in the volume 325. Alternatively, the open system processes the temporary file 324 received from the mainframe and saves the processed data in the temporarily file 327 for loading them into the database 326. That is, the data associated with the temporarily file 327 have already been converted and decoded but has not been placed in a database format for loading to the database 326.

In another embodiment, the temporary files 322 and 327 are not used for the data integration process. That is, the mainframe extracts and processes the data from the mainframe. The data then is stored as the temporary file 324 in the shared volume. The open system retrieves or receives and the temporary file 323 for processing. The resulting processed data that has been transformed to be suitable for the open system is stored in the database 326 directly without being stored in the temporary file 327.

Figure 4:
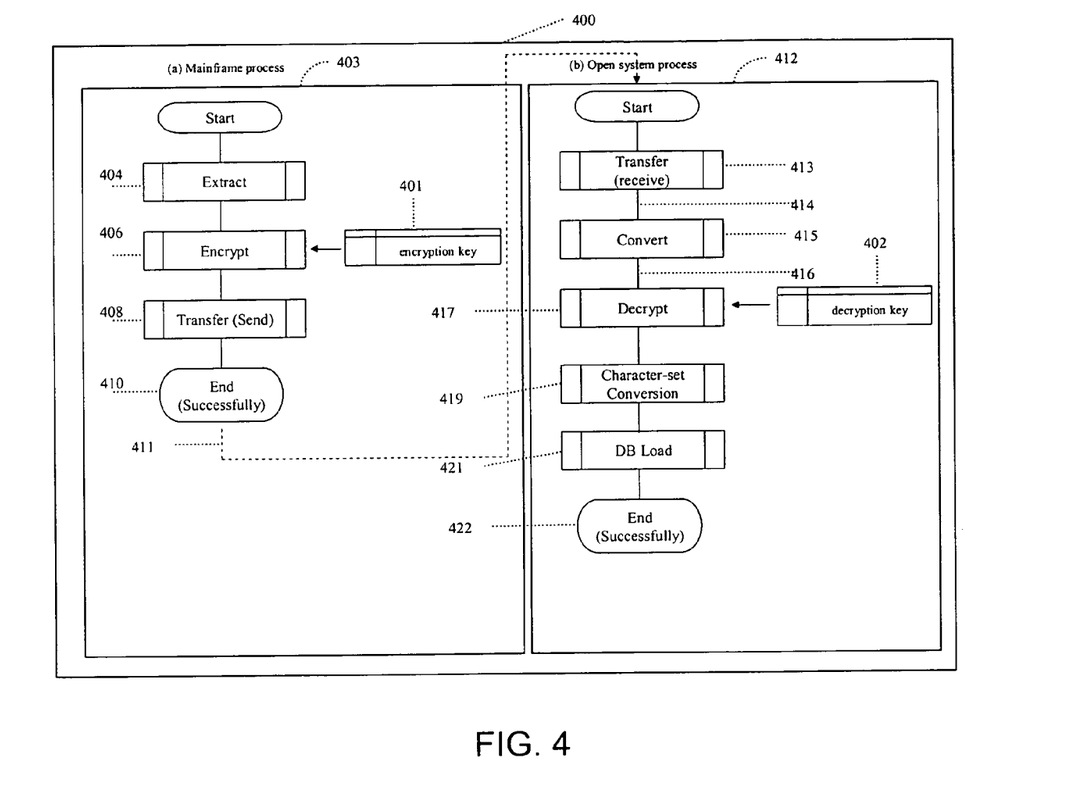
FIG. 4 illustrates a process for performing data integration according to one embodiment of the present invention.

FIG. 4 illustrates a process 400 for performing data integration according to one embodiment of the present invention. A sub-process 403 is performed at the mainframe side, and a sub-process 412 is performed at the open system side. At step 404, the mainframe extracts data from the database 321 using a sequential access method (SAM). The SAM is a file management system that allows records to be accessed sequentially in the order of input or randomly using an index. The index defines a different ordering of the records. Each index is associated with a key. Each type of database may have several indexes. Examples of SAMs includes indexed SAM and virtual SAM.

At step 406, the data that has been extracted at step 404 is encrypted using an encryption key 401 and stored in the temporary file 322. The temporary file includes the encrypted data. The temporary file 322 is send to the to open system volume 327 using the file sender 304 via the shared volume 323 (step 408). That is, the temporary file 322 is saved in the shared volume as the temporary file 324 according to the SAM. In one embodiment, the data handing steps 404 and 406 are performed using on-memory-handing system, such as UNIX pipe. That is, the data being processed is stored in a volatile memory device for security reasons. In one example of the volatile memory is a dynamic random access memory device.

The open system sequentially receives or accesses the temporary file 322 from the mainframe system 301 via the shared volume 323 and stores it as the temporary file 324 (step 413). The temporary file 324 is converted to a format that is compatible with the open system (step 415). Generally, the mainframe uses count-key-data (CKD) format so the temporary file received from the mainframe initially are in this format. The CKD format uses a variable data length format that is not compatible with the open system. The open system uses a fixed block architecture (FBA) format that uses fixed-length data. Accordingly in one implementation, the temporary file 327 is converted to the FBA format using the file format converter 310.

The converted file is decrypted using the data with the key 402 (step 417). In one implementation, the key 402 is a private key of the open system that corresponds to the public key used by the mainframe to encode the data at step 406. Alternatively, the keys 401 and 402 may be the same key as in the Common key standard.

Referring back to the sub-process 412, the decrypted data is converted from a first character-set suitable for the mainframe to a second character-set suitable for the open system (step 419). For example, the data is converted from the EBCDIC character set to the ASCII character set, so that the data may be read by the open system. Thereafter, the data is loaded to the database 326 and may be accessed by the open system at will (step 421). In one embodiment, the data handing steps 417, 419, and 421 are performed using on-memory-handing system for security reasons.

The process 400 ensures that the temporary files created for the data integration are encrypted according to the present embodiment. Therefore, these files would be secure even if an unauthorized third party is somehow able to gain access to them from the shared volume 323 or even from the volumes 320 and 325.

Figure 5:
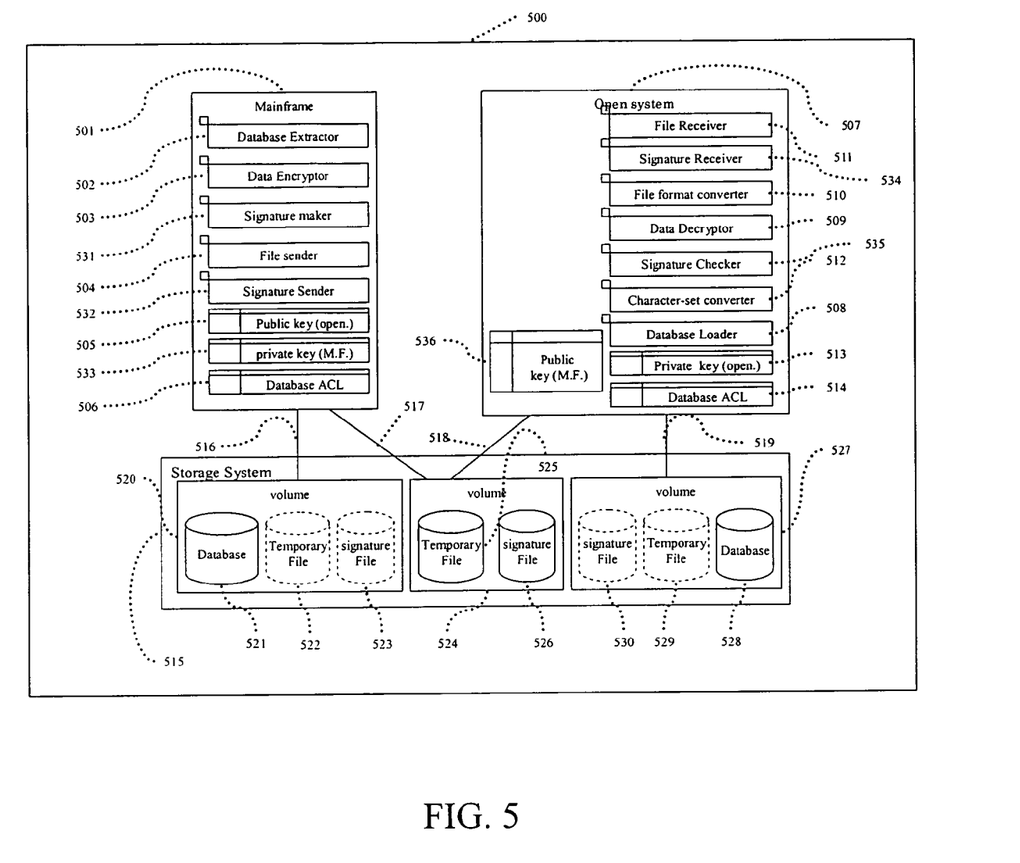
FIG. 5 illustrates an information processing system including a mainframe, an open system, and a storage system according to another embodiment of the present invention.

FIG. 5 illustrates an information processing system 500 including a mainframe 501, an open system 507, and a storage system 515 according to another embodiment of the present invention. The mainframe is coupled to the storage system via communication links 516 and 517. The open system is coupled to the storage system via communication links 518 and 519.

The mainframe 501 includes a database extractor 502, a data encryptor 503, a signature maker 531, a file sender 504, a signature sender 532, a first key 505, a second key 533, and a database ACL 506. The open system includes a file receiver 511, a signature receiver 534, a file format converter 510, data decryptor 509, signature checker 535, a character-set converter 512, a database loader 508, a third key 513, a database ACL 514, and a fourth key 536.

The first key 505 is a public key associated with the open system 507 and is used to encode data to be send to the open system. The second key 533 is a private key associated with the mainframe and is used to generate a digital signature. The private key 533 may also be used to decrypt data received from the open system. The third key 513 is a private key associated with the open system and is used to decrypt data received by the open system. The private key 513 may also be used to generate a digital signature of the open system. The fourth key 536 is a public key associated with the mainframe and is used to authenticate the digital signature received from the mainframe. The public key 536 may also be used to encrypt data to be sent to the mainframe by the open system.

The signature maker 531 of the mainframe is a module that is used to make a digital signature of the mainframe 501, so that the receiving system can verify that the sender of the data is the mainframe. The signature sender 532 of the mainframe is a module that sends the digital signature generated by the signature maker to a given destination, such as the open system.

In the open system, the signature receiver 534 is a module that receives the digital signature from the mainframe. The signature checker 535 is a module that validates the digital signature and the data received from the mainframe.

The storage system 515 includes a first volume 520 associated with the mainframe, a second volume 527 associated with the open system, and a shared volume 524. In one embodiment, the first volume may be accessed by the mainframe, but not by the open system. The second volume may be accessed by the open system, but not by the mainframe. The shared volume may be accessed by both the mainframe and the open system. Generally, the shared volume is not a secured volume, so that a third party may also be able to access the shared volume. Accordingly, a security risk exists when the data integration between the mainframe and the open system is performed using the shared volume, as would need to be done in the current SAN system.

Figure 7:
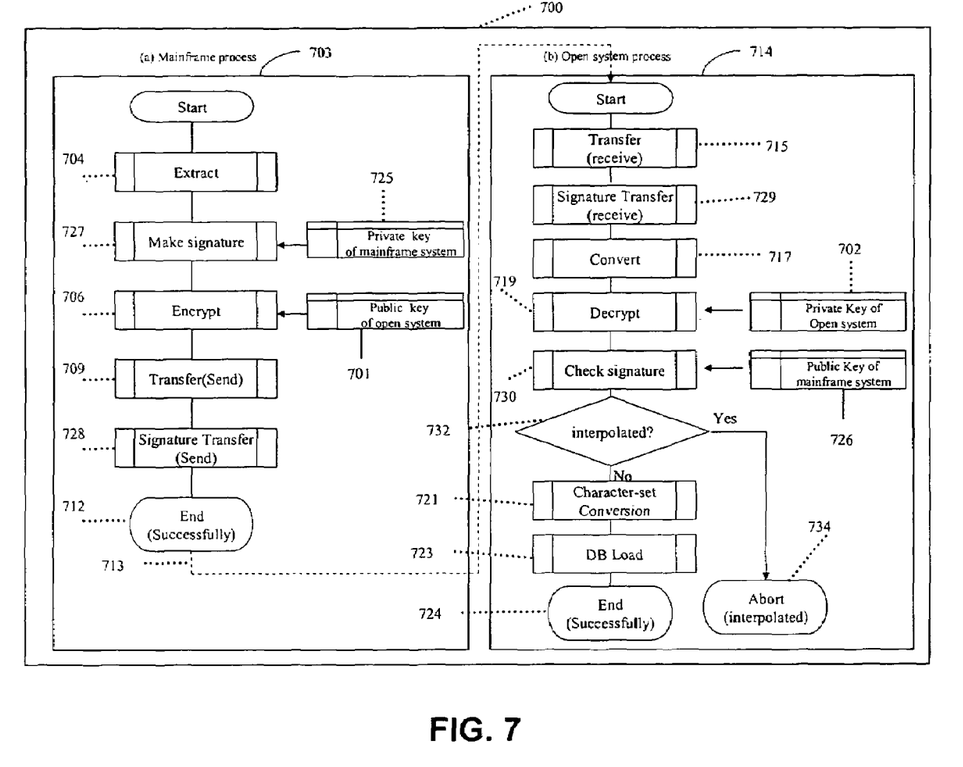
FIG. 7 illustrates a process for providing data integration between a mainframe and an open system according to one embodiment of the present invention.

The first volume includes a database 521, a temporary file 522, and a signature file 523. The shared volume 524 includes a temporary file 525 and a signature file 526. The second volume 527 is a database 528, a temporary file 529, and a signature file 530. The signature files are created for handling signatures associated with temporary files that are transmitted between the mainframe and the open system during the data integration process. The signatures files are generally temporary files that are used only once, as explained below in more details FIG. 7 illustrates a process 700 for providing data integration between a mainframe and an open system according to one embodiment of the present invention. A sub-process 703 relates to the steps performed primarily at the mainframe side, and a sub-process 714 relates to the steps performed primarily at the open side.

At step 704, the mainframe 501 extracts data from the database 521 using a sequential accessing method. The extracted data in an SAM file format. A digital signature of the mainframe is generated using a private key 725 of the mainframe and is stored in the signature file 523 (step 727). A digital signature is an electronic signature that can be used to authenticate the identity of the sender of data. The digital signature may also be used to ensure that the original content of the data that has been sent is not tempered. A digital signature may be used with any kind of data or information, whether it is encrypted or not.

In one embodiment, the digital signature is made by obtaining a hash of the extracted data. The hash is a mathematical summary of the data. The hash of the extracted data is then encrypted using the private key of the mainframe. The resulting encrypted hash is the digital signature of the mainframe. Accordingly, the digital signature of the mainframe may change each time different data is send to the open system.

The extracted data is encoded or encrypted using a public key 701 associated with the open system (step 706). Alternatively, the extracted data may be encoded or encrypted using the private key of the mainframe. The encoded data is sent to the open system (step 709). The encoded data is first saved as the temporary file 522 and then stored in the shared volume as the temporary file 525. The signature file 523 is sent to the open system via the shared volume (step 728). For this purpose, the signature file 523 is first stored in the shared volume as the signature file 526. In the present embodiment, the steps 704, 727, and 706 are performed using an on-memory-handling system of the mainframe. The steps 709 and 728 may be performed in a reverse order in certain embodiments.

At the open system side, the open system receives the temporary file 525 that has been temporarily stored in the shared volume (step 715). The open system receives the signature generated by the mainframe with respect to the temporary file 525 and has been temporarily stored in the shared volume. The format of the received temporary file 525 and the signature file 526 is converted to a format that is compatible with the open system, e.g., from CKD format to FBA format (step 717). The temporarily file is then decrypted using a private key of the open system (step 719). The received signature is authenticated by using a public key of the mainframe (step 730). If the signature cannot be authenticated, the process 714 is aborted (steps 732 and 734). If the signature is authenticated, the converted data is converted once again, i.e., transformed from a first character-set suitable for the mainframe (e.g., EBCDIC) to a second character-set (e.g., ASCII) suitable for the open system (step 721). The data is then loaded to the database 528, thereby placing the data in the database format and protected by database access control methods. In the present embodiment, the steps 719, 730, 732, and 721 are performed using an on-memory-handling system of the open system for security reasons. The steps 715 and 729 may be performed in a reverse order in certain embodiments.

Figure 6:
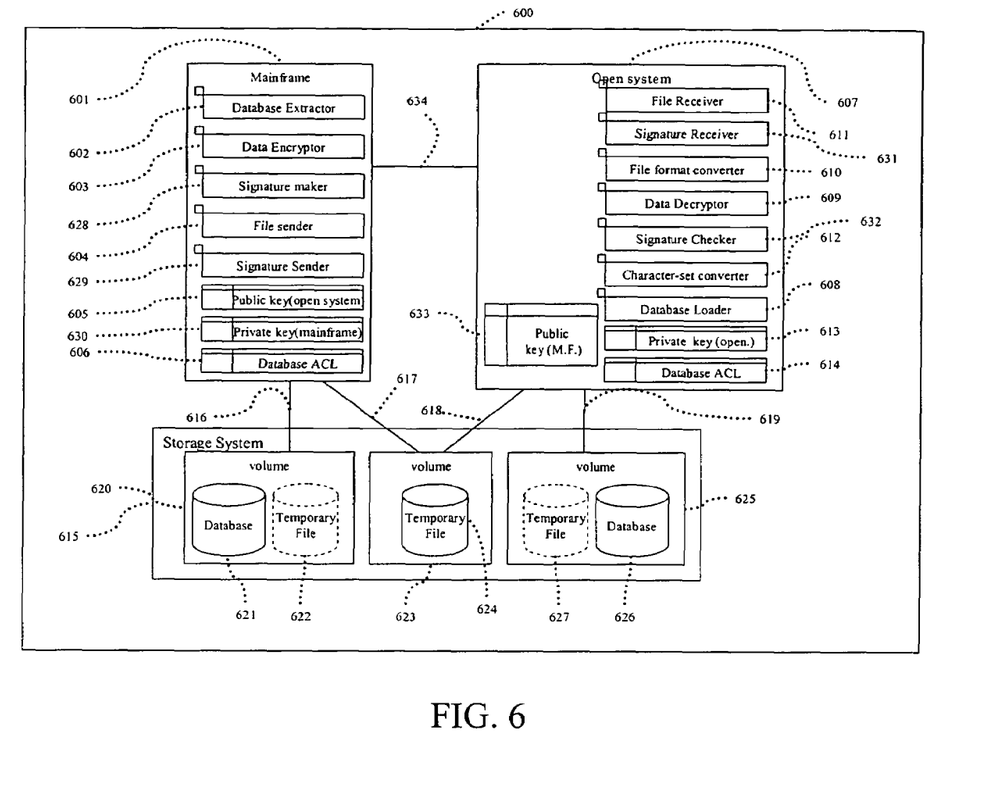
FIG. 6 illustrates an information processing system including a mainframe, an open system, and a storage system according to another embodiment of the present invention.

FIG. 6 illustrates an information processing system 600 including a mainframe 601, an open system 607, and a storage system 615 according to another embodiment of the present invention. The mainframe is coupled to the storage system via communication links 616 and 617. The open system is coupled to the storage system via communication links 618 and 619.

The mainframe 601 includes a database extractor 602, a data encryptor 603, a signature maker 628, a file sender 604, a signature sender 629, a first key 605, a second key 630, and a database ACL 606. The open system includes a file receiver 611, a signature receiver 631, a file format converter 610, data decryptor 609, signature checker 632, a character-set converter 612, a database loader 608, a third key 613, a database ACL 614, and a fourth key 633. The mainframe and the open system are coupled using a communication link or network 634, e.g., LAN, to exchange control or administrative information with respect to the data integration process. In the present embodiment, signatures generated by the mainframe are transmitted to the open system via the communication link 634 rather than using the shared volume, thereby providing an enhanced security compared to the previous embodiment.

The first key 605 is a public key associated with the open system and is used to encode data to be send to the open system. The second key 630 is a private key associated with the mainframe. The third key 613 is a private key associated with the open system and is used to decrypt data received by the open system. The fourth key 633 is a public key associated with the mainframe system and is used to validate the digital signature received from the mainframe.

The storage system 615 includes a first volume 620 associated with the mainframe, a second volume 625 associated with the open system, and a shared volume 623. In one embodiment, the first volume may be accessed by the mainframe, but not by the open system. The second volume may be accessed by the open system, but not by the mainframe. The shared volume may be accessed by both the mainframe and the open system. Generally, the shared volume is not secure volume, so that a third party may also be able to access the shared volume, thereby presenting a security risk when the data integration between the mainframe and the open system is performed via the shared volume.

The first volume includes a database 621 and a temporary file 622. The shared volume 623 includes a temporary file 624. The second volume 625 includes a database 626 and a temporary file 627. In the present embodiment, signatures are not stored in the storage system since they are send via the communication link 634. Accordingly, the storage system does not include signatures files. That is, two different channels are used for transferring data and signatures to provide enhanced security.

Figure 8:
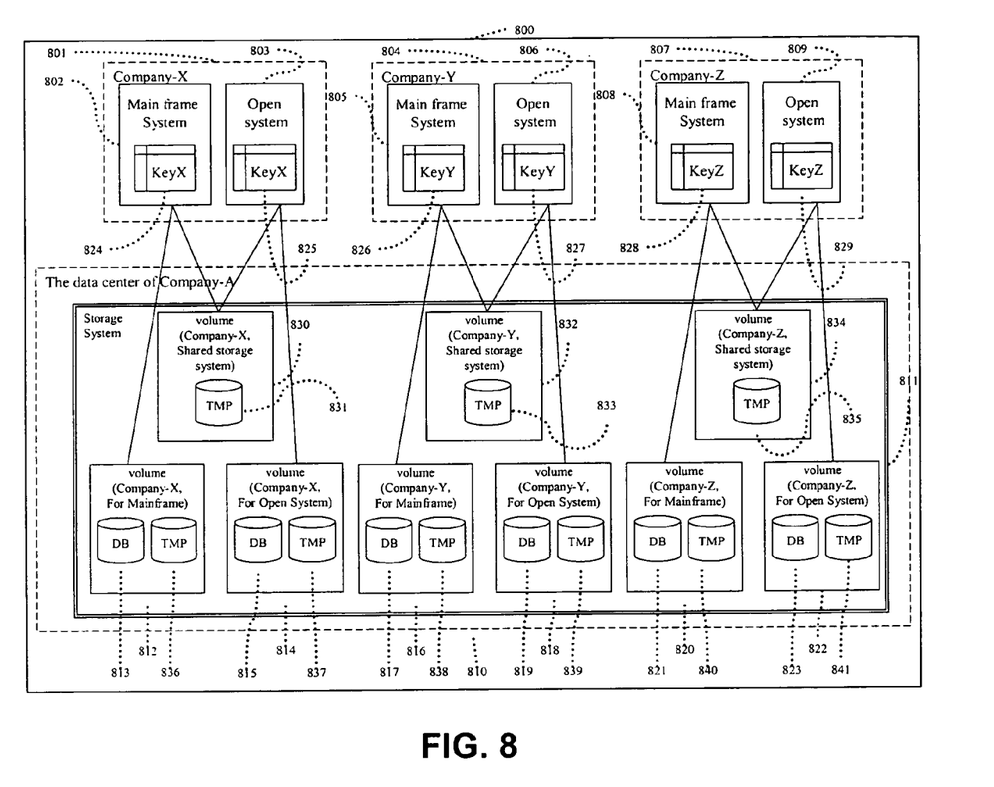
FIG. 8 illustrates an information processing system including a plurality of computer systems and a storage system that is coupled to the computer systems according to another embodiment of the present invention.

FIG. 8 illustrates an information processing system 800 including a plurality of computer systems 801, 804, and 807 and a storage system 811 coupled to the computer systems. The computer systems and the storage system are coupled to each other via a plurality of communication links Each of the computer system is associated with a different company. That is, the computer system 801 is associated with Company X and includes a mainframe 802 and an open system 803. The mainframe 802 includes one or more cryptography keys 824 for encrypting and decrypting information. The open system 803 includes one more cryptography keys 825 for encrypting or decrypting information. The computer system 804 is associated with Company Y and includes a mainframe 804 and an open system 806. The mainframe 805 includes one or more cryptography keys 826 for encrypting and decrypting information. The open system 806 includes one more cryptography keys 827 for encrypting or decrypting information. The computer system 807 is associated with Company Z and includes a mainframe 808 and an open system 809. The mainframe 808 includes one or more cryptography keys 828 for encrypting and decrypting information. The open system 809 includes one more cryptography keys 829 for encrypting or decrypting information.

The storage system includes a plurality of volumes. A volume 812 is associated with the mainframe of Company X. The volume 812 includes a database 813 and a temporarily file 836. A volume 814 is associated with the open system 803 of Company X. The volume 814 includes a database 815 and a temporary file 837. A shared volume 830 is shared by the mainframe and open system of Company X and includes a temporarily file 831. The shared volume 830 is dedicated to Company X and cannot be accessed or seen by other companies.

A volume 816 is associated with the mainframe of Company Y. The volume 816 includes a database 817 and a temporarily file 838. A volume 818 is associated with the open system of Company Y. The volume 814 includes a database 819 and a temporary file 839. A shared volume 832 is shared by the mainframe and open system of Company X and includes a temporarily file 833. The shared volume 830 is dedicated to Company Y and cannot be accessed by other companies.

A volume 820 is associated with the mainframe of Company Z. The volume 820 includes a database 821 and a temporarily file 840. A volume 834 is associated with the open system of Company Z. The volume 822 includes a database 823 and a temporary file 841. A shared volume 834 is shared by the mainframe and open system of Company Z and includes a temporarily file 835. The shared volume 830 is dedicated to Company Z and cannot be accessed by other companies.

In one embodiment, the information processing system 800 provides a data integration process corresponding to the process 400. In another embodiment, the system 800 provides a data integration process corresponding to the process 700. Accordingly, the temporarily files stored in the shared volumes are secured using the file security, SAN security, and cryptography The present invention has been described in terms of specific embodiments. The above embodiments have been used to illustrate the present invention and should not be used to limit the scope of the present invention. As will be understood by those skilled in the art, the above embodiments may be changed, modified, or altered without departing from the scope of the present invention. For example, the data integration process includes transmitting data from the open system to the mainframe, or from a computer system of first type to a computer system of second type. That is, the process is not limited to transferring data from the mainframe to the open system. Therefore, the scope of the invention is defined by the appended claims.

What is claimed is:

1. A method for performing data integration between two or more computer systems provided over a network, the method comprising:

extracting data from a first volume of a storage system, the first volume associated with a first computer system of first type, the extracted data having a first file format and a first character-set format, the storage system being coupled to a plurality of computer systems;

encrypting the data using a first security key;

storing the encrypted data and a signature file in a shared volume of the storage system;

receiving the encrypted data and the signature file from the shared volume of the storage system at a second computer system of second type, the first and second computer system being of different computer systems, wherein the second computer system comprises a file receiver, a file format converter, a data decryptor, a character set converter, a database loader, a signature receiver, and a signature checker;

converting the encrypted data and the signature file from the first file format to a second file format with the file format converter, the first file format being native to the first computer system and the second file format being native to the second computer system;

determining whether the signature file is authenticated by the first security key;

if the signature file is authenticated, decrypting the encrypted data using a second security key that is associated with the first security key;

converting the decrypted data from the first character-set format to a second character-set format with the character set converter, the first character-set format being native to the first computer system, the second character-set format being native to the second computer system; and thereafter, loading the decrypted data with the database loader to a second volume of the storage system, the second volume associated with the second computer system.

2. The method of claim 1, wherein the first computer system is a mainframe system, and the second computer system is an open system, and the plurality of computer systems being associated with a plurality of different companies.

3. The method of claim 1, wherein the first file format is a count key data format.

4. The method of claim 3, wherein the second file format is a fixed block architecture format.

5. The method of claim 1, wherein the first character-set format is an Extended Binary Coded Decimal Interchange Code (EBCDIC) format.

6. The method of claim 1, wherein the second character-set format is an American Standard Code for Information Interchange(ASCII) format.

7. The method of claim 1, wherein the first security key is a public key associated with the second computer system, and the second security key is a private key associated with the second computer system.

8. The method of claim 1, wherein the first security key is a private key associated with the first computer system, and the second security key is a public key associated with the first computer system.

9. The method of claim 1, wherein the first and second computer systems are coupled to the storage system via a storage area network and the storage system includes at least one disk array unit, wherein the first security key and the second security key are common keys.

10. The method of claim 1, further comprising:

storing the encrypted data in a third volume of the storage system, the third volume being associated with the first computer system, wherein the plurality of computer systems are associated with a plurality of different companies.

11. The method of claim 10, wherein the shared volume is configured to be accessed only by computer systems of a given company, the first and second computer systems being associated with the given company.

12. The method of claim 1, wherein the step of decrypting the received data using a second security key is performed after the step of converting the received data from the first file format to a second file format, and the step of converting the received data from the first character-set format to a second character-set format is performed after the step of decrypting the received data using a second security key.

13. The method of claim 1, further comprising:
generating a digital signature of the first computer system using the extracted data;
transmitting the digital signature from the first computer system to the second computer system;
receiving the digital signature at the second computer system; and
validating the received digital signature at the second computer system.

14. The method of claim 13, wherein the digital signature is transmitted from the first computer system to the second computer system via a first communication link that is different from a second communication link that is used to transfer the data from the first computer system to the second computer system.

15. A method for sharing data between a plurality of computer systems sharing a storage system, the method comprising:
receiving encrypted data and a signature file from a shared volume of the storage system at a second computer system of second type, the encrypted data being data that has been extracted from a first volume of the storage system that is associated with a first computer system of first type, the received data having a first format and a third format, wherein the second computer system comprises a file receiver, a file format converter, a data decryptor, a character set converter, a database loader, a signature receiver, and a signature checker;
converting the encrypted data and the signature file from the first format to a second format with the file format converter, the first format being native to the first computer system and the second format being native to the second computer system;
determining whether the signature file is authenticated by the first security key;
if the signature file is authenticated decrypting with the data decryptor the encrypted data using a second security key that is associated with a first security key that has been used to encrypt the extracted data at the first computer system; and
thereafter, loading with the data loader the decrypted data to a second volume of the storage system, the second volume being associated with the second computer system.

16. The method of claim 15, further comprising:
converting the received data from the third format to a fourth format, the third format being native to the first computer system, the fourth format being native to the second computer system.

17. The method of claim 16, wherein the first format is a file format of first type, and the second format is a file format of second type.

18. The method of claim 16, wherein the third format is a character-set of first type, and the fourth format is a character-set of second type.

19. The method of claim 18, wherein the step of converting the received data from the third format to a fourth format is performed after the step of decrypting the received data using a second security key, and the step of decrypting the received data using a second security key is performed after the step of converting the received data from the first format to a second format.

20. The method of claim 15, further comprising:
receiving a digital signature of the first computer, the digital signature being associated with the received data; and
authenticating the digital signature of the first computer system.

21. The method of claim 20, wherein the digital signature is received via a local area network and the data is received via a storage area network.

* * * * *